(12) United States Patent
Mildner et al.

(10) Patent No.: US 8,398,158 B2
(45) Date of Patent: Mar. 19, 2013

(54) FLOOR STRUCTURE OF A MOTOR VEHICLE BODY

(75) Inventors: Udo Mildner, Limburg (DE); Karsten Bohle, Bad Schwalbach (DE); Stanislaw Klimek, Franfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/430,361

(22) Filed: Mar. 26, 2012

(65) Prior Publication Data

US 2012/0248822 A1 Oct. 4, 2012

(30) Foreign Application Priority Data

Mar. 30, 2011 (DE) .................. 10 2011 015 541

(51) Int. Cl.
*B60N 2/00* (2006.01)
(52) U.S. Cl. .................. 296/193.07; 296/187.08
(58) Field of Classification Search ............. 296/193.07, 296/193.08, 204
See application file for complete search history.

(56) References Cited

U.S. PATENT DOCUMENTS

| | | | |
|---|---|---|---|
| 4,030,772 A | 6/1977 | Jacob et al. | |
| 5,002,333 A * | 3/1991 | Kenmochi et al. | 296/204 |
| 6,206,461 B1 | 3/2001 | Gaiser | |
| 6,540,286 B2 | 4/2003 | Takemoto et al. | |
| 6,568,747 B2 | 5/2003 | Kobayashi | |
| 7,270,369 B2 | 9/2007 | Okana et al. | |
| 7,325,866 B2 * | 2/2008 | Horton et al. | 296/205 |
| 7,637,561 B2 * | 12/2009 | Egawa et al. | 296/193.07 |
| 8,118,350 B2 * | 2/2012 | Mendoza et al. | 296/193.07 |
| 2001/0028179 A1 | 10/2001 | Takemoto et al. | |
| 2010/0244496 A1 | 9/2010 | Bellanger et al. | |

FOREIGN PATENT DOCUMENTS

| | | |
|---|---|---|
| AT | 195267 B | 1/1958 |
| DE | 914824 C | 7/1954 |
| DE | 1074416 B | 1/1960 |
| DE | 1151186 B | 7/1963 |
| DE | 2450763 A1 | 4/1976 |
| DE | 4020363 A1 | 1/1992 |
| DE | 4205891 A1 | 9/1993 |
| DE | 19633908 A1 | 2/1998 |
| DE | 19737242 A1 | 3/1999 |
| DE | 19811781 A1 | 9/1999 |
| DE | 19829432 A1 | 1/2000 |
| DE | 19860032 A1 | 6/2000 |
| DE | 10108287 A1 | 9/2001 |

(Continued)

OTHER PUBLICATIONS

UK IPO, British Search Report for Application No. 1201197.9, dated May 30, 2012.

(Continued)

*Primary Examiner* — Joseph Pape
(74) *Attorney, Agent, or Firm* — Ingrassia Fisher & Lorenz, P.C.

(57) ABSTRACT

A floor structure of a motor vehicle body is provided that has two side member arrangements substantially extending in vehicle longitudinal direction, which are interconnected by way of at least one front cross member and one rear cross member, and with a floor panel arranged above the cross members, which is provided with a reinforcing element substantially extending in vehicle longitudinal direction and arranged above the floor panel, which is structurally connected to at least one front cross member and to one rear cross member.

12 Claims, 7 Drawing Sheets

FOREIGN PATENT DOCUMENTS

| | | |
|---|---|---|
| DE | 10252472 A1 | 5/2004 |
| DE | 60110659 T2 | 2/2006 |
| DE | 602005003418 T2 | 9/2008 |
| EP | 1640252 A1 | 3/2006 |
| GB | 2475973 A | 6/2011 |
| JP | 2007083868 A | 4/2007 |

OTHER PUBLICATIONS

German Patent Office, German Search Report dated Nov. 10, 2011 for German Application No. 102011015541.4.

* cited by examiner

A-A

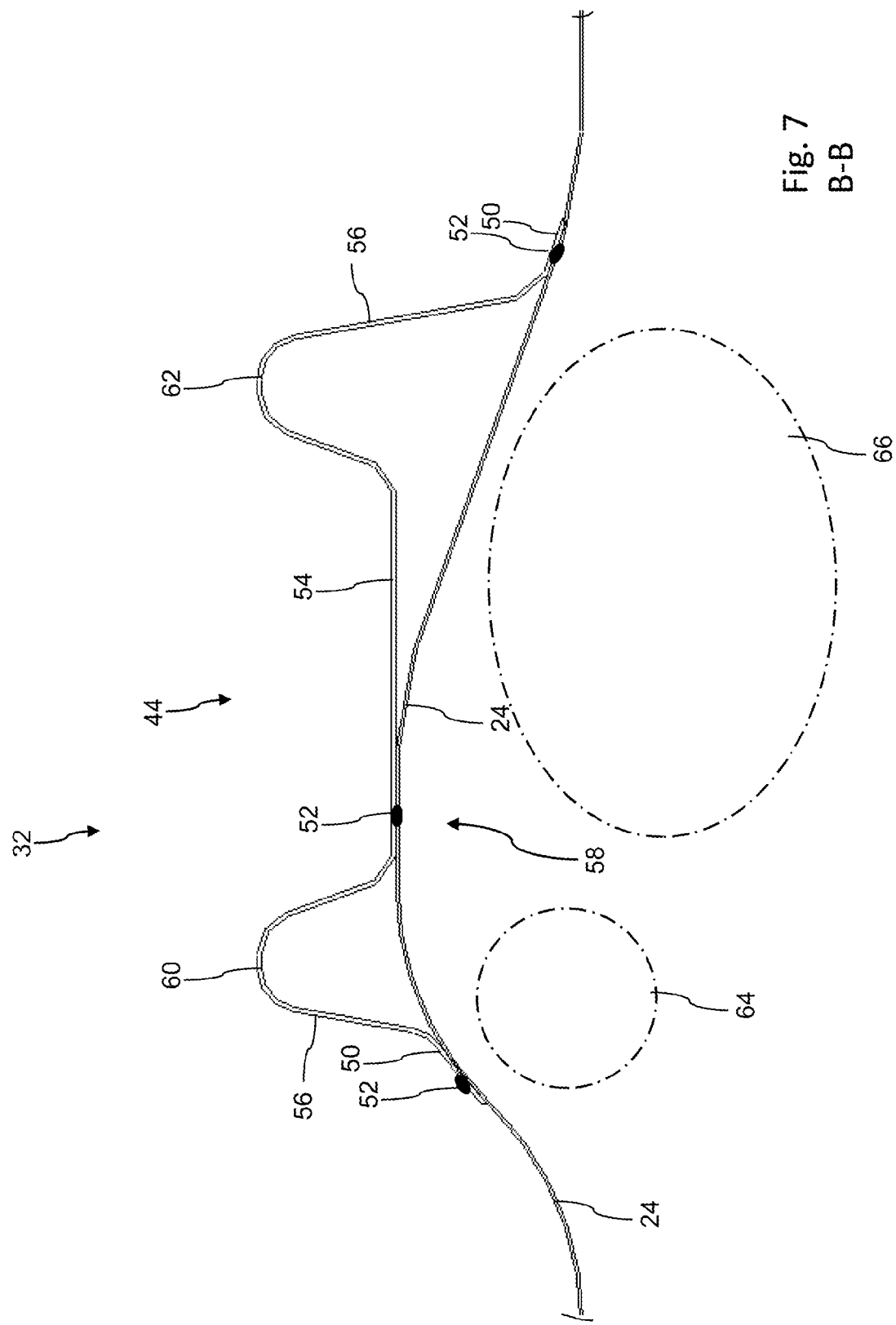

FLOOR STRUCTURE OF A MOTOR VEHICLE BODY

CROSS-REFERENCE TO RELATED APPLICATION

This application claims priority to German Patent Application No. 10 2011 015 541.4, filed Mar. 30, 2011, which is incorporated herein by reference in its entirety.

TECHNICAL FIELD

The technical field relates to a floor structure of a motor vehicle body with a floor panel and a plurality of cross members spaced from one another in vehicle longitudinal direction.

BACKGROUND

In motor vehicle body construction, different concepts of floor or underfloor structures are known. In the area of the passenger cell, two lateral side member arrangements are mostly provided, which are interconnected via individual cross members running in vehicle transverse direction. A support frame formed of these components can furthermore be provided with a floor panel, which largely fills out the intermediate space between the side members or cross members.

About in the middle between the side member structures, a center tunnel is to be mostly provided, which is either unitarily integrated in the floor panel or, particularly in the case of a floor panel that is designed of multiple parts, is adjoined by individual floor panel sections which are separately connected to the center tunnel. Thus, a floor panel is known from DE 60 2005 003 418 T2 that is produced by connecting a multiplicity of sheet metal components. It comprises a front floor section, a steep step section adjoining the front floor section and a rear floor section. Here, the front floor section is formed with a tunnel region connected to a front end with the instrument panel and to a rear end with the steep step section.

New types of drive concepts for motor vehicles, such as for example electric or hybrid drives require carrying along additional motor vehicle batteries or accumulators in the vehicle. Accordingly, suitable installation space has to be made available for such energy storage devices.

It is therefore at least one object to provide a floor structure for a motor vehicle body that on the one hand makes possible a simple and cost-effective manufacture and assembly, and which on the other hand contributes to a reduction of the vehicle weight. In addition, at least another object is to provide a floor structure in an effective utilization of the installation space that is available in the floor or underfloor region of the motor vehicle, particularly the accommodation of additional function parts and vehicle components in a space-saving manner. Furthermore, it is an object to provide the floor structure that is a torsionally rigid support structure, particularly for vehicle components to be fastened to the vehicle floor. In addition, other objects, desirable features and characteristics will become apparent from the subsequent summary and detailed description, and the appended claims, taken in conjunction with the accompanying drawings and this background.

SUMMARY

A floor structure is provided having two side member arrangements substantially extending in vehicle longitudinal direction is provided here, which are interconnected via at least one front cross member and one rear cross member spaced there from in vehicle longitudinal direction. The two side member arrangements in this case are arranged spaced from each other in vehicle transverse direction and substantially run parallel to each other.

Above the cross members, preferably also above the side member arrangements, a floor panel is arranged. The floor panel is provided with a reinforcing element substantially extending in vehicle longitudinal direction or arranged above the floor panel, consequently in the vehicle interior space. The reinforcing element in this case is connected structurally, i.e., in a force-transmitting manner, to at least one front cross member and to at least one rear cross member.

The reinforcing element increases the torsional stiffness of the floor structure and connects at least two cross members of the floor structure arranged spaced from each other in vehicle longitudinal direction. The reinforcing element in this case is entirely arranged in the interior region or dry region of the motor vehicle body. With the reinforcing element, a subdivision of the frame structure created by side member arrangements and cross members can be formed, which is better able to absorb or discharge into adjoining support structure components any longitudinal or transverse forces that occur in the event of a collision.

The floor structure is particularly designed for motor vehicles with comparatively elevated seating, such as for example sport utility vehicles (SUV) or multiple purpose vehicles (MPV). With such vehicles, which per se already bring with them a high degree of ground clearance, the floor panel can be arranged entirely above all support structure components, particularly above the side member arrangements as well as above all cross members. Here, it is even conceivable to design a front floor panel region that comes to lie in the footwell of the front passengers largely without center tunnel.

Insofar, the reinforcing element mentioned here can come to lie in the region of a conventional center tunnel arrangement and replace or even improve its stabilizing effect on the floor structure. Because of the floor panel being arranged comparatively high up, installation space located below the floor panel can be utilized for example to accommodate a fuel tank and/or vehicle batteries or vehicle accumulators.

According to an embodiment, it is provided that the reinforcing element is directly connected with both the floor panel as well as with the front and with the rear cross member. Here, the rear cross member can be designed as seat cross member for example and be arranged below the front seats of the motor vehicle. Through the direct connection of the reinforcing element to at least two cross members as well as to the floor panel, the reinforcing element can structurally interconnect the at least two cross members spaced from each other in vehicle longitudinal direction for the transmission of mechanical load paths. Any forces introduced into the front cross member in vehicle longitudinal and/or vehicle transverse direction can insofar be discharged into the rear cross member via the reinforcing element located inside.

Providing a reinforcing structure located inside in the form of the reinforcing element additionally makes it possible to design the floor panel located below in a comparatively thin-walled and thus weight-reducing manner as well as unitarily, at least in vehicle transverse direction, throughout. In that the reinforcing element is not only connected to the cross members but also to the floor panel, the floor panel can also be reinforced and suitably stabilized mechanically by the reinforcing element.

Here it can be provided furthermore that the reinforcing element extends approximately in the middle between the two lateral side member structures. Through the middle arrangement in vehicle transverse direction a symmetrical arrangement can be created in order to be able to absorb in the same manner any forces introduced into the floor structure from opposite sides.

According to another embodiment, it is provided to design the reinforcing element at least in regions in the manner of an inverted cup profile or in the manner of a double inverted cup profile, so that in installation situation on the floor structure it forms a largely closed cross-sectional profile with the floor panel located below. The reinforcing element advantageously has a cross section that is designed downwardly open towards the floor panel and in the manner of an inverted cup profile. By fastening the reinforcing element to the floor panel a closed cross-sectional profile can finally be formed in the region of the reinforcing element.

For this purpose, the reinforcing element according to a further embodiment comprises a flange structure that is at least almost circumferential and protruding to the outside. With said flange structure, the reinforcing element can be connected to the floor panel and/or to the cross members in a fixed and non-detachable manner. Advantageously, materially joined connecting techniques, particularly welding of reinforcing element and floor panel or of reinforcing element and cross member(s) are possible here.

Depending on the shaping of the reinforcing element, the flange structure can also be designed partially interrupted in order to be able to fasten the reinforcing element as continuously as possible also in the region of bent locations of the floor panel to the latter. In addition to welding, riveting or gluing connections as well as penetration joining are possible as connecting techniques in principle. The flange structure or the edge of the reinforcing element set off in the manner of a flange additionally causes a stiffening of the reinforcing element as such.

According to an embodiment, the reinforcing element, based on the vehicle longitudinal direction (x), extends from a firewall cross member as far as to a seat cross member located behind that in driving direction. The seat cross member in this case is advantageously fastened above the side member arrangements and provides a floor section that is elevated relative to the front footwell, to which the front vehicle seats can be fastened. In addition, it can be provided that the floor panel and the reinforcing element are not only interconnected with one, but with two front cross members arranged spaced from each other in vehicle longitudinal direction. A first front cross member in this case can be designed for example as firewall cross member, while a second front floor cross member to be provided further back on the vehicle is arranged located in front of a front footwell section of the floor panel. For example, the front floor cross member can be arranged in a transition region of the floor panel from a firewall connecting region that is raised or runs obliquely upwards to a front footwell region of the floor panel that is substantially designed horizontally. In that the reinforcing element, as well as the floor panel, are each fastened separately with at least three cross members arranged spaced from each other in vehicle longitudinal direction, the structural stiffness and torsional stiffness of the motor vehicle and its floor structure can be further increased.

According to another embodiment, the reinforcing element can also comprise in a section located between the front and the rear cross member a trough facing the floor panel and separately connected to the floor panel. Insofar as the reinforcing element in this region is designed in the manner of an inverted cup profile, it has a cross-sectional contour designed in the manner of a double inverted cup profile in the region of the trough that is separately connected to the floor panel.

If the reinforcing element is provided in vehicle transverse direction (y) with marginal fastening flange sections directed to the outside, the reinforcing element, seen in vehicle transverse direction, can be connected in a cross-sectional region running through the trough in three ways, namely with the two flange sections located outside as well as with its trough region. In this manner, the structural stiffness of the floor panel can be advantageously increased with the help of the reinforcing element. Furthermore, by using the reinforcing element, the wall thickness of the floor panel as a whole can be reduced and thus the weight of the floor structure lowered.

According to another embodiment, the floor panel can also be designed unitarily, if required even without center tunnel. Here, it extends continuously in vehicle transverse direction from a right side member structure to a left side member structure. The floor panel can also be designed largely flat or continuous in the region of a center tunnel that is to be otherwise provided. Dependent on any function parts or vehicle components running below the floor panel such as for example a propeller shaft or an exhaust system, the floor panel can also have a curvature for example in the region of the reinforcing element.

In vehicle longitudinal direction, the floor panel that is preferably formed unitarily can extend from a firewall cross member located at the front at least as far as to a seat cross member, if applicable also beyond a seat connecting region designed in an elevated manner as far as to a heel plate. In the transition region to the seat cross member, the floor panel has a transition region that runs obliquely upwards and the back. Below this floor panel section that is designed elevated relative to the front footwell, further function parts of the motor vehicle, in particular a fuel tank or vehicle batteries or accumulators can also be accommodated.

Here it is provided furthermore that the floor panel for forming a rear footwell drops at least slightly, if applicable step-like against the driving direction, i.e., facing the rear region of the floor structure. The rear footwell formed by the floor panel in this case can be located above the level of the front footwell. Because of the previously described arrangement, the side members the entire floor panel is arranged comparatively high up in the vehicle anyway. A propeller shaft or an exhaust system can therefore run completely below the floor panel in the region of a seat connection structure designed further elevated and in the region of the rear footwell, so that a structural matching of the floor panel to the function parts of the motor vehicle located below is principally not required.

In this region, the floor panel can have a structure without center tunnel that is largely formed flat. The seat cross member which is arranged in the transition region of the front footwell to the elevated floor section forming the seat connecting structure can have a recess that is designed approximately in the manner of an arc approximately in the middle between the side member arrangements, for example for receiving an exhaust system or a propeller shaft for the all-wheel drive of the motor vehicle.

Here it proves to be advantageous if the reinforcing element in the region of this recess borders on the rear cross member and through its connection to the rear cross member structurally reinforces the latter in the mentioned recess region. A recess required through the geometrical matching of the seat cross member and a naturally accompanying weakening of the seat cross member can be largely compensated through the direct connection to the reinforcing element located in the interior space.

It must further be noted that according to another embodiment, a motor vehicle body with a described floor structure as well as a corresponding motor vehicle, particularly a sport utility vehicle or a multipurpose vehicle are provided, which have a previously described floor structure.

BRIEF DESCRIPTION OF THE DRAWINGS

The present invention will hereinafter be described in conjunction with the following drawing figures, wherein like numerals denote like elements, and:

FIG. 7 a cross section along B-B according to FIG. 4.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
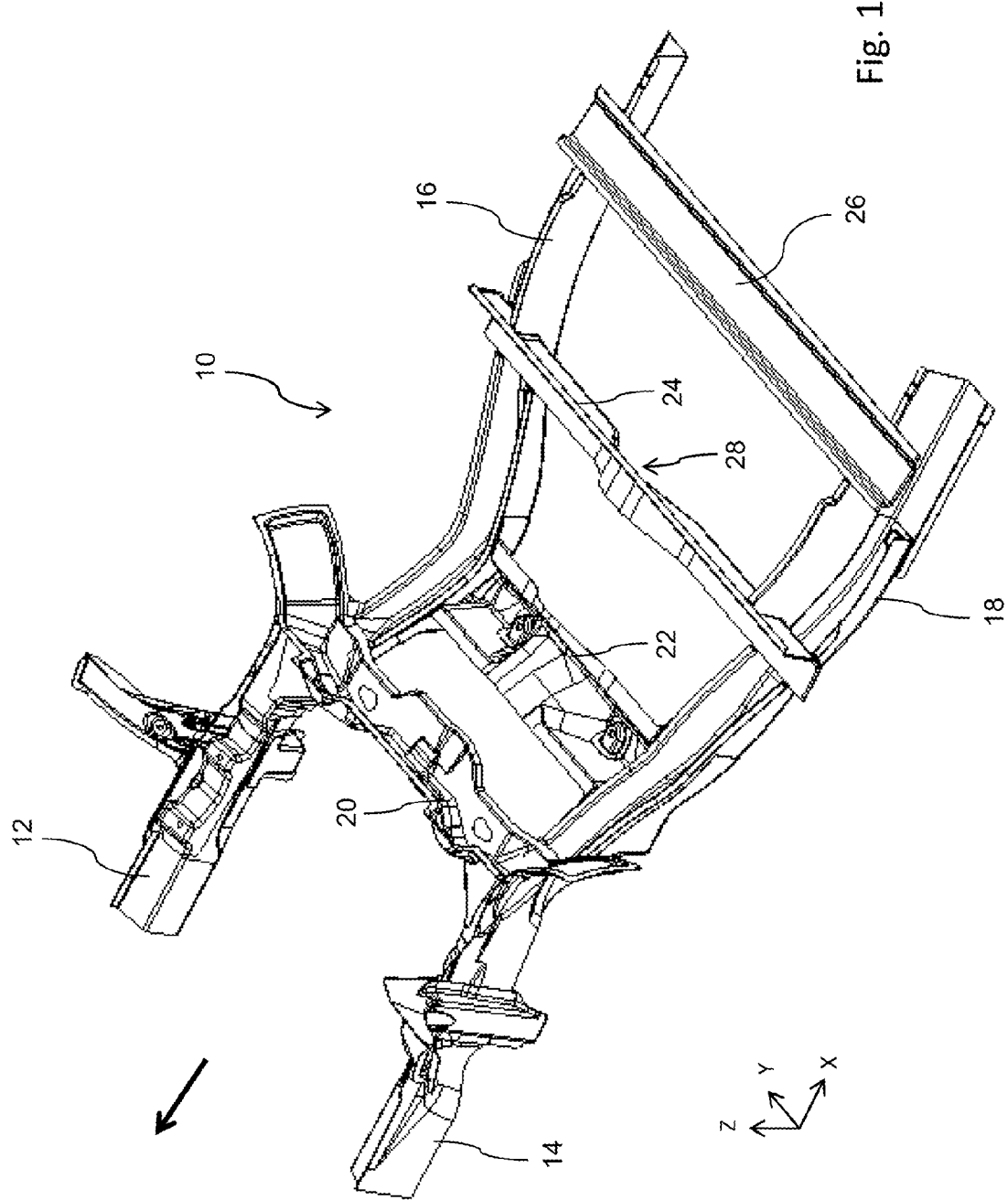
FIG. 1 a frame structure of a motor vehicle body altogether comprising four cross members is perspective representation.
Figure 2:
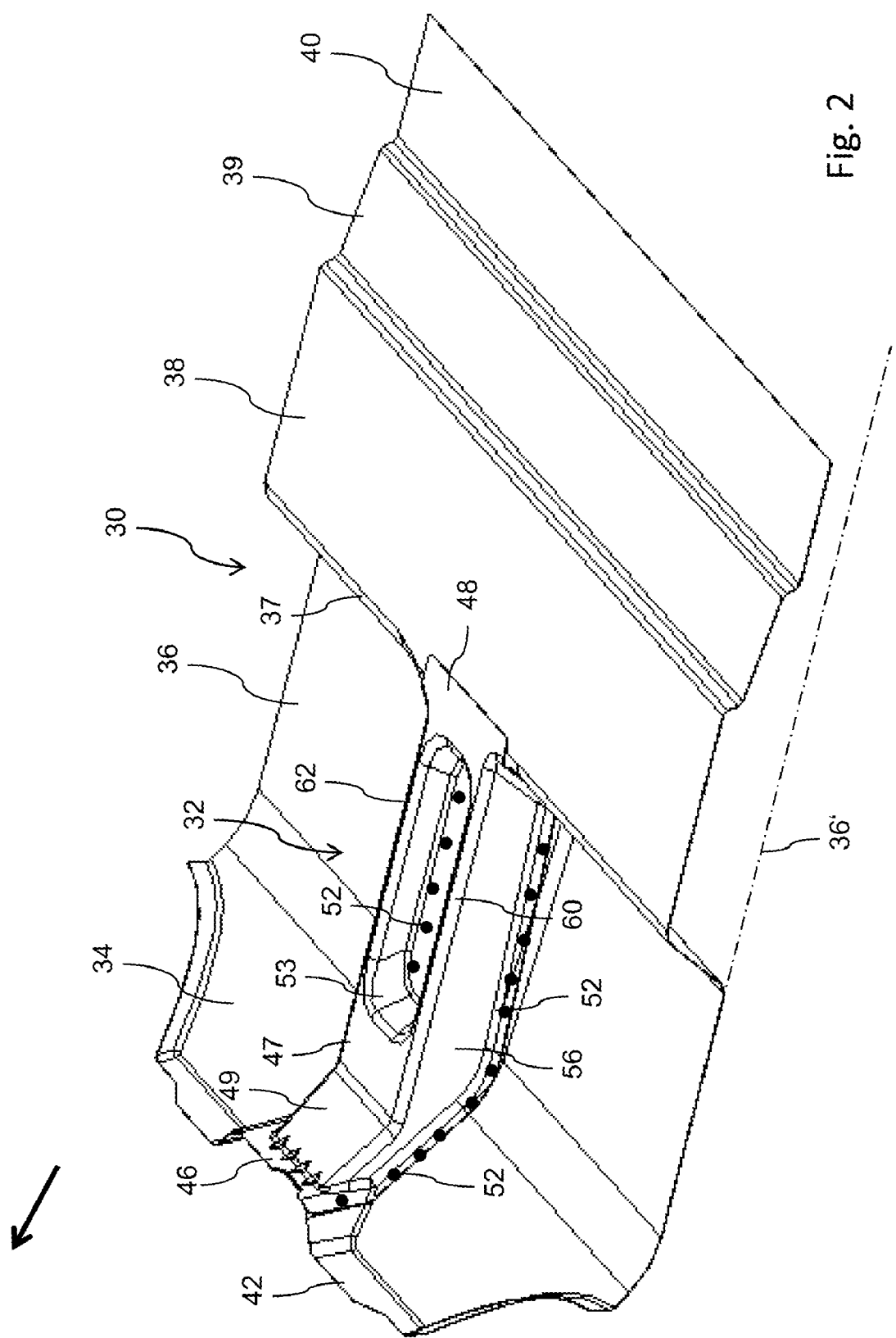
FIG. 2 an isolated perspective representation of a continuous and unitarily designed floor panel that can be arranged on the frame structure according to FIG. 1.
Figure 3:
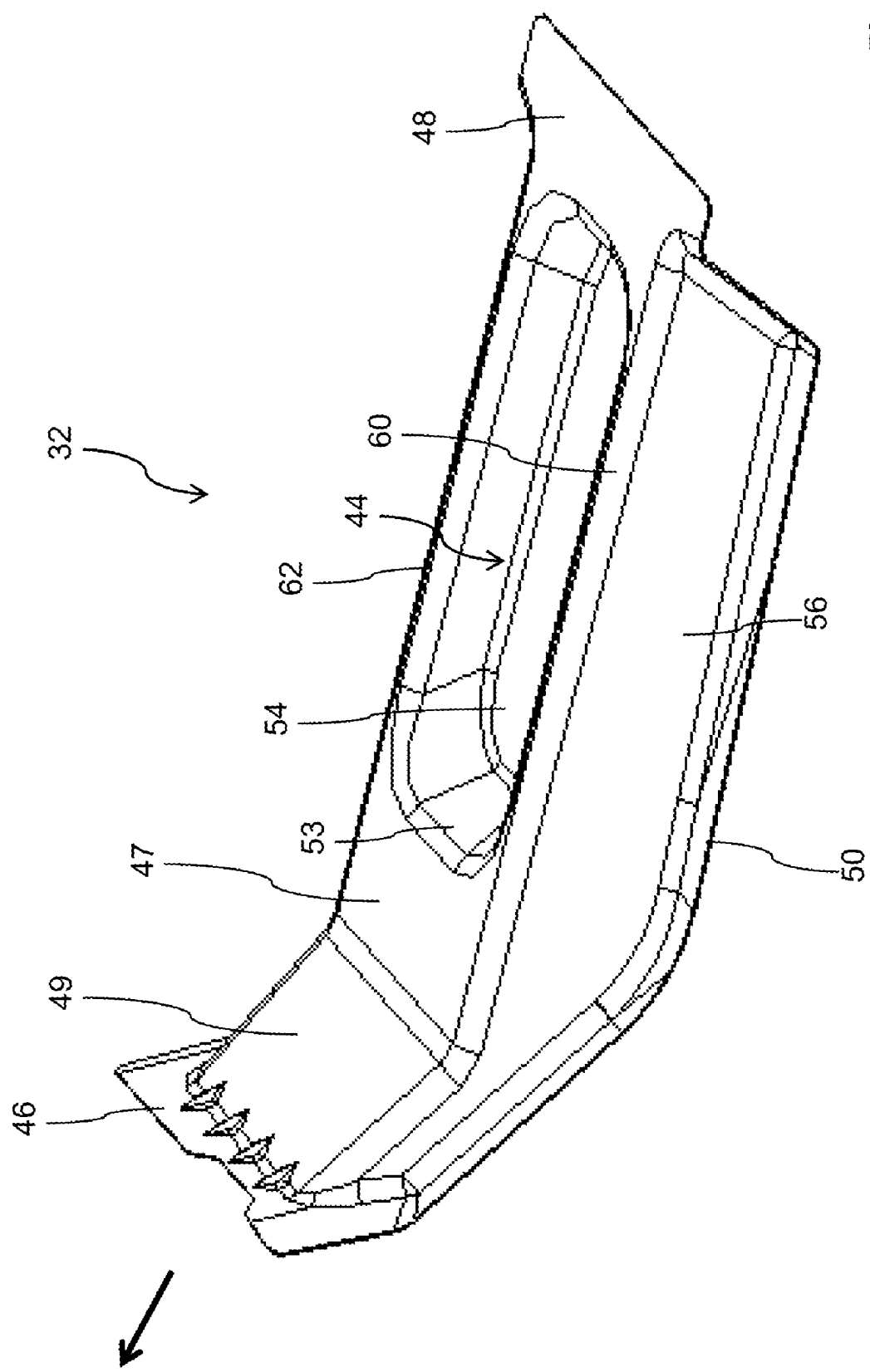
FIG. 3 an isolated representation of a reinforcing element to be arranged above the floor panel according to FIG. 2.

The floor structure 10 shown in FIG. 1 to FIG. 7 comprises two lateral side member arrangements spaced from each other in vehicle transverse direction (y). In the region of a firewall cross member 20 connecting the side member arrangements, front side members 12, 14 merging into front frame extensions 16, 18 running to the back, opposite to the driving direction. These support structure components 16, 18 of U-profile design called side members for the sake of simplicity are furthermore connected to a front floor cross member 22 and further back to a first rear cross member 24 and a second rear cross member 26. In particular, the two rear cross members 24, 26 in this case are arranged above the side members 16, 18 and serve for the forming of a seat connecting section 38 of a floor panel 30 designed elevated relative to a footwell 36, as is shown in FIG. 2 in an isolated manner.

The floor panel 30 designed continuously both in x as well as in y-direction comprises part regions individually merging into one another in vehicle longitudinal direction (x) according to its representation in FIG. 2, for example a firewall section 34 protruding forward and obliquely upwards, a front footwell section 36, a transition region 37 running obliquely to the back and top adjoining thereto and an elevated seat connecting region 38 adjoining thereto. Further to the back, opposite to the driving direction marked with the arrow in the Figures, the floor panel 30 merges into a rear footwell section 40 for the back passengers step-by-step via a shoulder 39. It must be noted here that the rear footwell section 40 lies at a higher level than the front footwell section 36.

Here, compared with FIG. 2, the height level of the front footwell section 36 is indicated with an interrupted line 36'. Between the firewall section 34 adjoining the firewall cross member 20 towards the front and the seat connecting section 38 designed elevated, a reinforcing element 32 located inside approximately in the middle between the side members 16, 18 and which is represented in an isolated manner in FIG. 3. In contrast with a conventional center tunnel, this reinforcing element 32 reminding of a center tunnel structure is closed towards the bottom by the footwell section 36 of the floor panel 30 that is designed continuous in vehicle transverse direction (y). The reinforcing element 32 to this extent does not offer any hollow space for receiving function parts of the motor vehicle but exclusively or predominantly serves for a structural reinforcement of the floor panel 30.

Through the position of the floor panel 30 above all cross members 20, 22, 24, 26 and above the two side members 16, 18 no center tunnel formation at all is provided in the front footwell section 36, and if so only to quite a reduced extent. The reinforcing component 32 represented in FIG. 3 in an isolated manner comprises an inverted cup or double inverted cup cross-sectional profile, such as is illustrated for example in FIG. 7. In addition, it has a circumferential flange structure 46, 48, 50, wherein a connecting flange 46 facing in driving direction in assembly situation on the vehicle body comes to lie directly congruently with a front connecting flange 42 of the floor panel, so that the floor panel 30 together with the reinforcing element 32 can be connected to the firewall cross member 20 in one and the same connecting operation, for example by means of spot welding and subject to the formation of the spot welds 52 shown in FIG. 6.

In a similar manner, a continuation of the reinforcing element 32 protruding to the back, against the driving direction, can also come to bear against the seat connecting section 38 of the floor panel 30 designed in an elevated manner where it can be welded to the floor panel section as well as to the cross member 24 of approximately L-shaped design located below and an upper connecting flange horizontally standing away provided thereon.

Figure 5:
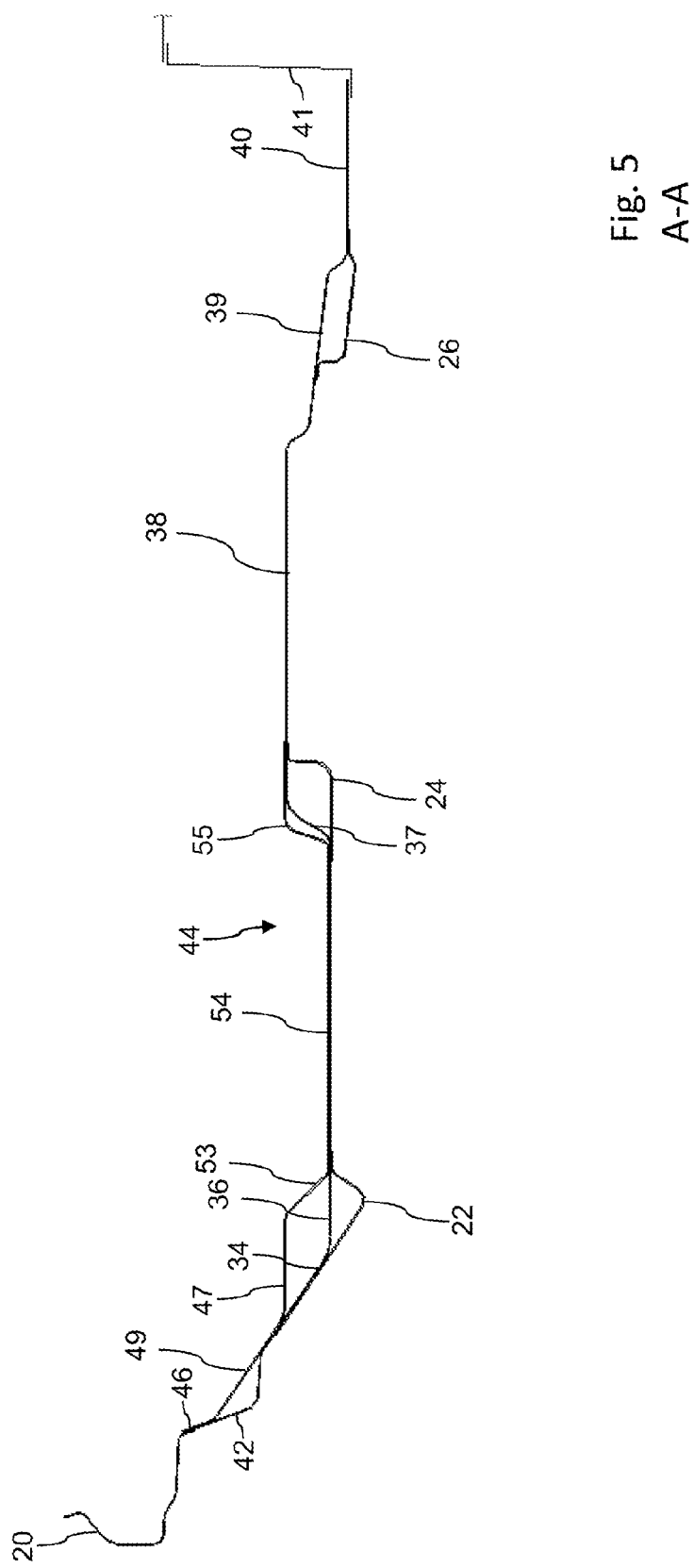
FIG. 5 a cross section along A-A according to FIG. 4.
Figure 6:
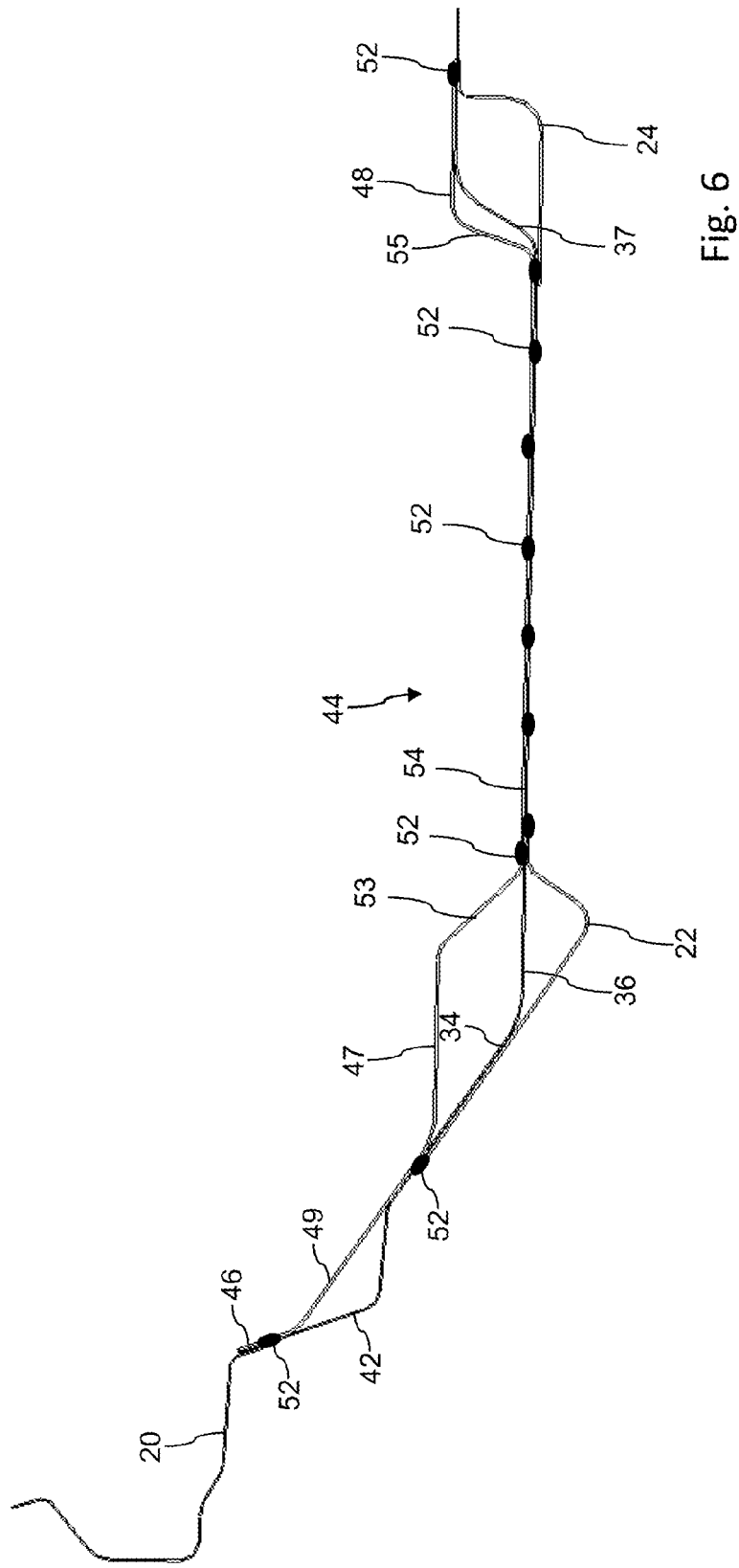
FIG. 6 an enlarged representation of the left part of the cross section shown in FIG. 5.

According to the cross-sectional representations of FIG. 5 and FIG. 6 a double chamber profile can even be formed in the connecting region adjoining the first rear cross member 24. On the one hand, the floor panel 30 with an obliquely running transition region 37 already forms a closed hollow space with the cross member 24. On the other hand, the reinforcing element 32 with its fastening continuation protruding to the back comes to lie once again in a covering manner and subject to the formation of a further hollow space located between transition region 37 and trough transition 55. In addition to the flange 46, 48 protruding in driving direction to the front and to the back, the reinforcing element 32, also comprises lateral flange sections 50 largely continuously formed and standing away to the outside, by means of which the reinforcing element 32 can be connected also along its longitudinal profile to the footwell section 36 located below and/or to the firewall section 34 of the floor panel 30.

Accordingly, individual spot welds 52 following the flange structure 50 are indicated in FIG. 2. It is furthermore provided that the reinforcing element 32 comprises an inverted cup profile that is designed open towards the bottom merely in its front and rear connecting region to front cross members 20, 22 and the rear cross member 24. In the region located in between, which substantially extends over the front footwell section 36 of the floor panel 30, the reinforcing element 32 has a trough 44 curved to the inside the trough base 54 of which can be separately connected in vehicle longitudinal direction to the floor panel 36 located below. In a region of the trough 44, individual spot welds 52 are indicated in FIG. 6. A triple connection of the reinforcing element 32 resulting there from to the floor panel 36 located below is shown for example in cross section B-B in FIG. 7.

Towards the front, facing the driving direction, the trough 44 merges into a front profile section 47 by way of an obliquely running trough transition 53. Trough transition 53 and front profile section 47 of the reinforcing element 32 together with the floor panel 30 that is likewise configured curved in this region form a diamond-like structure as is illustrated in the cross section shown in FIG. 5 and FIG. 6.

In this transition region, the front floor cross member 22 is additionally provided, wherein the reinforcing element 32, the floor panel 30 and the cross member 22 are welded together in triple overlapping regions. The floor panel 36 in this case is located between the front section 47, 49 of the reinforcing component 32 and the front floor cross member 22 located below. In the region, in which the front profile section 47 of the reinforcing element 32 substantially running parallel to the floor section 36 adjoins the firewall section 34 of the floor panel, a profile section 49 protruding forward and to the top is formed on the reinforcing element 32, on the front end of which the fastening flange 46 is provided.

With the front profile section 49 and the fastening flange 42 of the floor panel 30 located below and standing away towards the top a further hollow chamber profile for improving the structural stiffness of the connection of the fastening flange 42 to the floor panel 30 can be created. Furthermore, it is evident in the cross section along A-A according to FIG. 5 that the floor panel 30 forms a closed hollow chamber profile also with the second rear cross member 26. The transition region 37 adjoining the seat connecting region 38 of elevated design against the driving direction closes off the cross member 26 of approximately L-shaped design in the transition to a rear footwell section 40. It is evident that the floor panel 30, which is of continuous and unitary design both in vehicle longitudinal direction (x) as well as in vehicle transverse direction (y), adjoins as far as to a heel plate 41.

In the cross-sectional representation according to FIG. 7, a double inverted cup-like cross-sectional contour of the reinforcing element 32 in the region of the trough 44 is finally shown. The front and rear profile section 47, 48 of the reinforcing element 32 in this case lie in the plane of the marginal stampings 60, 62 approximately indicated hump-like in FIG. 7. In the trough region located inside, the two profile sections 60, 62 are connected via the trough floor 54 that is substantially designed flat or matched in its contour to the floor panel 30 located below.

Towards the outside, the marginal profile sections 60, 62 each merge into fastening flange sections protruding to the outside via a lateral web 56. Their orientation and marginal contour follows the shaping of the footwell section 36 of the floor panel 30 arranged below. As is indicated in FIG. 7, the floor panel 30 in this footwell section 36 can have a curvature or stamping 58 that is at least slightly directed towards the inside or towards the top in order for example to provide adequate space for a propeller shaft 64 or for an exhaust system 66.

Figure 4:
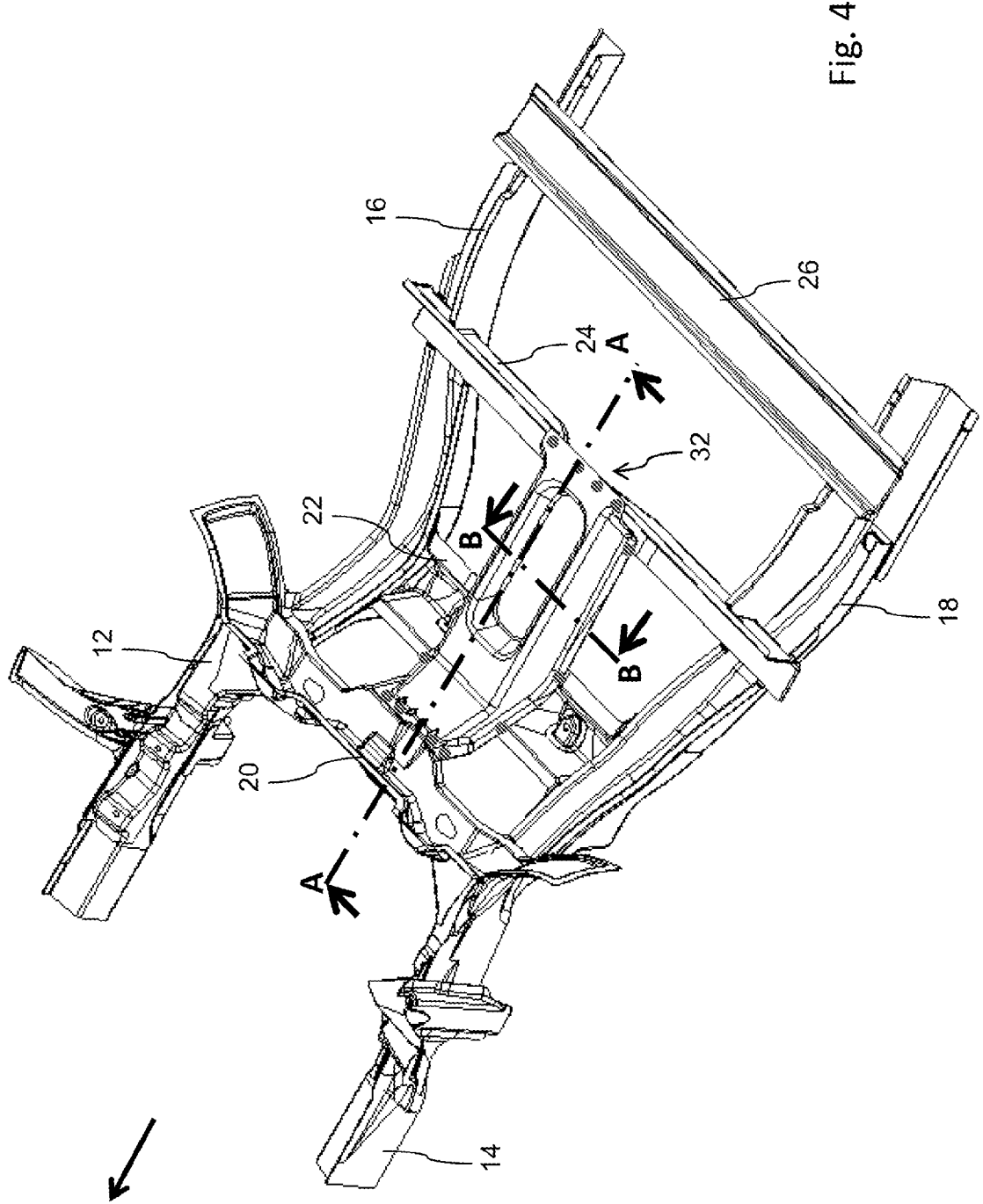
FIG. 4 the frame structure shown in FIG. 1 with a reinforcing element connected thereto.

Furthermore, a recess 28 formed approximately in the middle at the bottom of the seat cross member 24 is shown in FIG. 1 and FIG. 4. The recess has a shaping approximately corresponding to the contour of the curvature 58 of the floor panel 30. Because of the propeller shaft 64 or exhaust system to be accommodated of necessity below the floor structure 10 a recess 28 such as this also has to be provided on the seat cross member 24. The structural weakening of the seat cross member 24 accompanied by this however can be compensated and if required even further reinforced through the connection and the overlapping arrangement with the floor panel 30 and with the reinforcing element 32 adjoining the region of the recess 28 of the seat cross member 24.

The illustrated floor structure is provided in particular for vehicles with a comparatively high ground clearance, particularly for sport utility vehicles or for multipurpose vehicles. Through the arrangement of the floor panel above the side members and by forming a seat connecting region 38 embodied elevated compared with a front footwell, the area-spanning floor panel 30 can be designed in one piece, so that it can continuously extend from a front firewall cross member 20 to a heel plate 41 as well as from a left side member 18 and a corresponding sill structure to a right side member 16 or a corresponding sill structure. The elevation of the floor panel 30 makes possible accommodating function components such as for example a fuel tank or vehicle batteries in the outer region of the motor vehicle below the front seats.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A floor structure of a motor vehicle body, comprising:
a front cross member;
a rear cross member;
a right side member structure and a left side member structure that each substantially extend in a vehicle longitudinal direction and are interconnected with the front cross member and the rear cross member;
a single, unitary floor panel arranged above the front cross member and the rear cross member, that extends continuously from the right side member structure to the left side member structure; and
a reinforcing element that substantially extends in the vehicle longitudinal direction, arranged above the floor panel, and structurally connected to the front cross member and the rear cross member.

2. The floor structure according to claim 1, wherein the reinforcing element is connected to the floor panel, the front cross member, and the rear cross member.

3. The floor structure according to claim 1, wherein the reinforcing element extends approximately in a middle between the two side member arrangements.

4. The floor structure according to claim 1, wherein in at least regions of the reinforcing element, the reinforcing element has an inverted cup profile and forms a closed cross-sectional profile with the floor panel.

5. The floor structure according to claim 1, wherein in at least regions of the reinforcing element, the reinforcing element has a double inverted cup profile and forms a closed cross-sectional profile with the floor panel.

6. The floor structure according to claim 1, wherein the reinforcing element comprises a circumferential flange structure that is configured to fasten to the floor panel.

7. The floor structure according to claim 1, wherein the reinforcing element comprises a circumferential flange structure that is configured to fasten to the front cross member and the rear cross member.

8. The floor structure according to claim 1, wherein the reinforcing element based on the vehicle longitudinal direction extends from a firewall cross member as far as to a seat cross member.

9. The floor structure according to claim 1, wherein the floor panel and the reinforcing element are structurally connected to the front cross member and a second front cross member, and which based on the vehicle longitudinal direction, are arranged in front of a front footwell section of the floor panel.

10. The floor structure according to claim 1, wherein the reinforcing element in a section located between the front cross member and the rear cross member has a trough facing the floor panel that is separately connected to the floor panel.

11. The floor structure according to claim 1, wherein the floor panel extends in the vehicle longitudinal direction from a firewall cross member at least as far as to a seat cross member or as far as to a heel plate.

12. The floor structure according to claim 1, wherein the rear cross member includes a recess formed approximately in a middle of the rear cross member and the reinforcing member is positionable adjacent to the recess to structurally reinforce the recess.

* * * * *